US011927935B2

(12) United States Patent
Jaunarajs et al.

(10) Patent No.: US 11,927,935 B2
(45) Date of Patent: Mar. 12, 2024

(54) NEAR PROXIMITY NON-CONTACT CAN PRODUCTION TOOLING AND TOOL CHARACTERISTICS IDENTIFICATION AND TRACKING SYSTEM (71) Applicant: Integrated Packaging Solutions, LLC, Wheat Ridge, CO (US)

(72) Inventors: Kalvis Jaunarajs, Littleton, CO (US); Kevin Gillest, Winter Park, CO (US); Michael Calahan, Arvada, CO (US)

( * ) Notice: Subject to any disclaimer, the term of this patent is extended or adjusted under 35 U.S.C. 154(b) by 0 days.

(21) Appl. No.: 17/378,298

(22) Filed: Jul. 16, 2021

(65) Prior Publication Data
US 2023/0018332 A1  Jan. 19, 2023

(51) Int. Cl.
G05B 19/18 (2006.01)
G06K 7/10 (2006.01)

(52) U.S. Cl.
CPC ....... *G05B 19/182* (2013.01); *G06K 7/10297* (2013.01); *G05B 2219/37599* (2013.01)

(58) Field of Classification Search
CPC ...... G05B 2219/37599; G05B 19/4187; G05B 2219/31095; G05B 2219/33207; G05B 2219/49302; G05B 2219/49304
See application file for complete search history.

(56) References Cited

U.S. PATENT DOCUMENTS

| | | | | |
|---|---|---|---|---|
| 7,093,756 B2 * | 8/2006 | Muehl | ............... | G05B 19/4183 235/451 |
| 7,286,888 B2 * | 10/2007 | Monette | ........... | G05B 19/41865 700/121 |
| 11,007,562 B2 * | 5/2021 | Gillest | ............... | G05B 19/4187 |
| 2003/0102367 A1 * | 6/2003 | Monette | ............ | G05B 19/4183 235/376 |
| 2008/0148801 A1 * | 6/2008 | Olson | ................ | B21D 51/2615 72/426 |
| 2018/0239934 A1 * | 8/2018 | Dalgleish | ........... | G06K 7/10316 |
| 2020/0353529 A1 * | 11/2020 | Gillest | ................. | G05B 19/401 |
| 2021/0260868 A1 * | 8/2021 | Ojima | .................... | B41F 17/14 |

FOREIGN PATENT DOCUMENTS

WO   WO-9857763 A1 * 12/1998 ......... B21D 51/2692
WO   WO-9965646 A1 * 12/1999 ............. B21D 51/26

* cited by examiner

*Primary Examiner* — Jennifer L Norton (57) ABSTRACT

Industrial production facilities (such as can making factories) may tag with radio frequency near proximity devices their tooling (knockouts, dies, punches, etc) so that the tooling may be instantly located on any particular machine or location in the facility, by known critical characteristics of the tooling, particularly diameter. This is possible because each machine will also have a reader for the tags, and other areas such as inventory shelves, inspection stations, doors, loading docks, shipping departments and even vendors may also have the reading devices. Passive RFID tags and readers may be used for this purpose. The invention may be open to other businesses so inventory may be located across manufacturing systems and/or businesses.

15 Claims, 7 Drawing Sheets

NEAR PROXIMITY NON-CONTACT CAN PRODUCTION TOOLING AND TOOL CHARACTERISTICS IDENTIFICATION AND TRACKING SYSTEM

STATEMENT REGARDING FEDERALLY FUNDED RESEARCH

This invention was not made under contract with an agency of the US Government, nor by any agency of the US Government.

CROSS-REFERENCE TO RELATED APPLICATIONS

N/A

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but reserves all copyright rights whatsoever. 37 CFR 1.71(d)

FIELD OF THE INVENTION

This invention relates generally to can production and the tooling for can production, and specifically to better methods of tracking precision can production tooling by characteristics such as material, diameter, type, length and so forth (because dies and punchs must have precisely known inner and outer diameters and other characteristics) as the tooling is used in an industrial production facility, re-ground to specification, re-used, shipped between vendors, and so forth.

BACKGROUND OF THE INVENTION

Control of the locations and identities of modern industrial production tooling is vital to smooth and economical operation of mass production facilities, in particular, can making facilities. Most tooling is assumed to be identical, but in fact in many applications each piece of tooling is slightly different yet must match with other pieces of tooling in order to maintain proper production efficiency. One example of this need is making cylindrical bodies such as cans.

The modern method of making an aluminum or steel can or other cylindrical bodies utilizes a "bodymaker", a device which through punching repeated ironing of a cup turns the cup into a can, finished except for trimming, flanging, coating, decoration, necking, etc, and the can end which is a separate entity/unit and which is seamed on later.

The bodymaker must form the aluminum or steel cup body in a series of steps, called drawing and ironing. These steps (drawing, redrawing, and repetitive ironing) require a series of punches and dies for the various steps, carried out at high speed and yet required to produce a can having a very precise weight of material. To little material and the can may meet specifications/requirements, too much material results in a waste of material and thus money on the can. The weight of the can, for a given size of can, depends on the wall thickness, more so than on minor deviations in diameter of the can. Deviations as small as 0.0001" can cause problems, so the tools used are measured to that level of accuracy or more. Literally, 0.0001" is critical.

The steps of can making may be generalized as follows: the initial punch generally reshapes the cup, however, the can after the first draw is not yet the proper size and shape; the cup is then forced through a redraw die, which reduces the cup to the desired diameter, but does not really get the wall thickness to within the desired/acceptable range, the can is then punched through several (for example, three) ironing dies, each of which gradually reduces the wall thickness. Finally the can goes through a QA step of checking wall thickness, can weight, regularity and so on. This step is surprisingly important, very small variations in can wall thickness can cause the cost of 100,000 cans (a fairly small number) to increase, simply due to using up too much aluminum or steel during the ironing processing.

The process sounds straightforward, but in fact there is an additional element which causes a cascade of potential problems. In particular, the dies and punches wear. As they wear, they change size, and the cans produced on the varying dies and punches then depart from the acceptable weights. During QA, this departure is noted and at that point, production is normally shut down while a new die or punch or both is/are substituted for the worn one. In general, the dies' inner diameter (ID) becomes larger while the punches' outer diameter (OD) becomes smaller during the course of usage, wear, and regrinding.

Worse, in full scale production a die may last less than 2 days (or less than 1 million cans). Given that a full set is one punch and four dies, if they wore out at random and unrelated intervals there would be additional down time periods when the bodymaker had to be shut down for replacement.

However, a "tool set" of properly matching dies and punches is actually necessary, as the dies are in fact related in size. The problem is that if the redraw die begins to wear upward in ID and has to be replaced, it must be replaced with one exactly the same size. If the replacement is not the same exact size, then the entire sequence of punches and dies is unusable for production and must be replaced entirely.

Downtime increases the cost of the cans or bodies produced. Unnecessary tooling changes or extra tooling inventory costs money. In addition, cans becoming too thin to pass inspection costs money as do cans becoming too thick. One estimate is 0.10$ to 0.20$ per one thousand cans is wasted due to improper thickness. Since a production line produces a million cans every day or two, and most facilities have multiple lines going, this amount of money adds up quickly.

Thus, it is necessary to closely monitor the characteristics of the dies and punches in production.

Since a typical die is around $100, it is desirable to send the die/punch to the production facility tool shop for regrinding. Even this only allows a given die to be used around half a dozen times, and it introduces another layer of sizing complexity. In particular, the die can only be ground upward in size, so the other dies in the same tool set must also be ground upward to match when they come off the production line. To revert to the previous example, if the redraw die is ground to a new larger diameter by 0.0002" (twice as much as 0.0001", and thus double the deviation which can be very important) then the rest of the die set must be ground larger as well. This would result in cans/cylindrical bodies of a very slightly larger diameter but still with the requisite wall thickness at the end of production.

Handling of this procedure has in the past required hour to hour ad hoc judgements by experienced machinists in the tool shop. In general, the tool room staff would need to recall, if they knew, what sizes of tool sets are being used on the production line (or more likely, on multiple production lines all operating simultaneously), and then the tool room staff literally looks at the dies sitting on the inventory shelf and guesses what sizes are likely to wear next and need to be replaced promptly. Since the tool room will require a period of time (hours) to regrind dies, there is no economic possibility of doing it "on the fly". It would be better to have the correct tool ready, so instead of doing it in response to needs, the machinist simply carries an inventory and tries to stay ahead of the next need, based on his/her experience.

Figure 4:
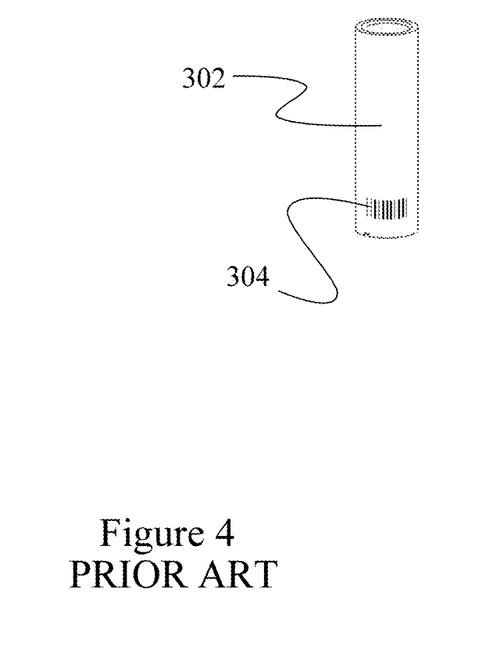
FIG. 4 is a PRIOR ART drawing of a production tool having a bar code incised thereon.

Thus, tracking a piece of tooling not just by identity but also BY CHARACTERISTICS is necessary. As shown in FIG. 4 PRIOR ART tooling may have a bar code laser incised upon it to allow tracking by scanning the bar code manually.

In this prior art scenario, the tool room staff are estimating what tools are required in what sizes while also manually scanning tools bar codes at an optical scanner whenever they remember that they are moving a tool from the tool room to the production floor or vice-versa. This is better than not tracking the tools at all, but still has a large possibility for human error. Furthermore, the only way to know where a tool is located is to look up the location on the computer database attached to the optical scanner.

It would be better to eliminate the element of human error in the tool tracking process.

It would be preferable to provide an automated method of tracking each item of tooling at all times, and to track it not just by an identity number but to track it, and all other tooling, by characteristics.

It would be preferable to track tooling type, diameter, taper, size, length, material, vendor, shape, tooling usage, and/pr other required critical characteristics and also identity, rather than just identity alone.

It would yet further be preferable to allow tooling location to be known and updated on a continuous basis, not just at moments when it is manually scanned.

In fact, it would also be preferable to track a tool in greater detail (to record the tool passing through doorways for example) and in a greater number of locations, for example, in shipping or in a tooling vendor's premises, so that the size (OD, ID, other characteristics, etc) of tooling may be known both inter-business and intra-business.

SUMMARY OF THE INVENTION

General Summary

The present invention teaches an industrial facility for mass production of cans, which can-making industrial facility has devices allowing near proximity non-contact tracking of the tooling used in the can production machinery: for example body-makers and neckers, cuppers and trimmers. Then the tooling would consist of the knockouts, dies and punches which are mounted into (and function as part of) the body-makers, neckers, etc for a few days (or perhaps for one million cans or so depending on circumstances) before being removed, replaced, and sent to the regrind bins to await regrinding or to be replaced. After half a dozen or so cycles, the dies and punchs may go through shipping to the tooling vendor, with new tooling coming from the tooling vendor in exchange.

Note that tools and tooling in this case does not refer to any hand tools, power tools, consumer goods or the like, but rather to industrial machinery easily mistaken for part of the production facility itself. The tooling is mounted firmly within the can making machines and remain there for a large number of cycles of use.

Radio frequency identification or RFID is a technology in which small tagging devices are placed onto an item to be tracked and "readers" (also scanners, sensors, etc) detect their near proximity. Normally the RFID tags are passive, without power sources, while the RFID readers are actively powered, and the radio energy from the reader powers the tag when in range. Such active tag/passive reader designs have a range of a few feet (one or two meters) which is usually enough for most applications.

For some applications, an active tag may be used instead, in particular, when longer ranges of tens of meters or more are desired. However, normally the shorter range is actually required as the body-makers and other machinery and doors, spaces and so forth will be reasonably close.

Both types and other types now known or later developed may be used in the present invention.

RFID tags are placed on each die or punch or other item of production tooling. RFID readers are placed on each piece of industrial production machinery. In the case of can production this would be one RFID reader on each body-maker, cupper, necker and so forth.

But in addition, at strategic points within the production facility, additional RFID readers are placed. Chokepoints such as doorways and hallways are one example, as are loading docks, stairwells, exits and entrances and so forth. The tool room, the tool storage area and so forth are included.

Further in addition, RFID readers are placed on the inventory shelves of tooling awaiting usage, the inspection stations, the grinders in the tool room, and the regrind bins in which tooling awaits regrinding. Yet further, the shipping department may have RFID readers and even vendors such as the tooling vendor may as well.

Obviously, an information system may be used to track the RFID identification happening in real time, allowing a user of the system to find out instantly exactly where any particular tool may be found.

Summary in Reference to Claims

It is therefore another aspect, advantage, objective and embodiment of the invention, in addition to those discussed previously, to provide an industrial facility for mass production of cans using industrial production tools which include but are not limited to knockouts, punches, dies, and shapers, the industrial facility comprising:

- a plurality of N can making machines, and a plurality of industrial production tools which are knockouts, punches and dies, each can making machine having at least one industrial production tool mounted to it, each industrial production tool having an RFID tag;
- a production area, the plurality of can making machines disposed in the production area, the production area having a first door;
- a tool room area, the tool room area having a re-tool storage space, a re-tooling machine, an inspection station, and an inventory storage space, the tool area having a second door;
- a first RFID reader disposed at the first door;
- a second RFID reader disposed at the second door;
- a third RFID reader disposed at the re-tool storage space;
- a fourth RFID reader disposed at the re-tooling machine;
- a fifth RFID reader disposed at the inspection station;

a sixth RFID reader disposed at the inventory storage space;

a plurality of N additional RFID readers disposed at the plurality of can making machines, one each of the N additional RFID readers disposed at each one of the plurality of can making machines, whereby each can making machine has a single RFID reader;

each RFID reader having a range R;

a group of assigned places, the group consisting of the plurality of can making machines, the first and second doors, the re-tool storage space, the re-tooling machine, the inspection station, and the inventory storage space;

each member of the group being located apart from any other member of the group at a distance equal to or greater than the range R whereby any single RFID tag of the plurality of RFID tags is only readable by one RFID reader, whereby the location of each one of the plurality of industrial production tools may be known.

It is therefore another aspect, advantage, objective and embodiment of the invention, in addition to those discussed previously, to provide an industrial facility for mass production of cans comprising: wherein the range R of each single RFID reader of the plurality of RFID readers is determined individually after being disposed at one member of the group.

It is therefore another aspect, advantage, objective and embodiment of the invention, in addition to those discussed previously, to provide an industrial facility for mass production of cans comprising: wherein the RFID tags are passive RFID tags.

It is therefore another aspect, advantage, objective and embodiment of the invention, in addition to those discussed previously, to provide an industrial facility for mass production of cans comprising: wherein the RFID tags are active RFID tags.

It is therefore another aspect, advantage, objective and embodiment of the invention, in addition to those discussed previously, to provide an industrial facility for mass production of cans comprising: wherein the RFID readers are active readers.

It is therefore another aspect, advantage, objective and embodiment of the invention, in addition to those discussed previously, to provide an industrial facility for mass production of cans comprising: wherein the RFID readers are passive RFID readers.

It is therefore another aspect, advantage, objective and embodiment of the invention, in addition to those discussed previously, to provide an industrial facility for mass production of cans comprising: wherein the RFID readers are active RFID readers.

It is therefore another aspect, advantage, objective and embodiment of the invention, in addition to those discussed previously, to provide an industrial facility for mass production of cans comprising: wherein the industrial facility for mass production further produces cylindrical bodies, and further wherein the industrial production machines are cylindrical body making machines.

It is therefore another aspect, advantage, objective and embodiment of the invention, in addition to those discussed previously, to provide an industrial facility for mass production of cans comprising: wherein the industrial facility for mass production further produces cans, and further wherein the industrial production machines are can making machines.

It is therefore another aspect, advantage, objective and embodiment of the invention, in addition to those discussed previously, to provide an industrial facility for mass production of cans comprising: wherein the industrial production tools further comprise: can making dies.

It is therefore another aspect, advantage, objective and embodiment of the invention, in addition to those discussed previously, to provide an industrial facility for mass production of cans comprising: wherein the industrial production tools further comprise: can making punchs.

It is therefore another aspect, advantage, objective and embodiment of the invention, in addition to those discussed previously, to provide a can production tool comprising:

a die having an RFID tag.

It is therefore another aspect, advantage, objective and embodiment of the invention, in addition to those discussed previously, to provide a can production tool comprising:

a punch having an RFID tag.

It is therefore another aspect, advantage, objective and embodiment of the invention, in addition to those discussed previously, to provide an industrial facility for mass production of cans wherein each one of the plurality of industrial production tools has a first characteristic associated with it.

It is therefore another aspect, advantage, objective and embodiment of the invention, in addition to those discussed previously, to provide an industrial facility for mass production of cans wherein the first characteristic is diameter.

It is therefore another aspect, advantage, objective and embodiment of the invention, in addition to those discussed previously, to provide an industrial facility for mass production of cans wherein each one of the plurality of industrial production tools has a first set of characteristics associated with it.

It is therefore another aspect, advantage, objective and embodiment of the invention, in addition to those discussed previously, to provide an industrial facility for mass production of cans wherein the first set of characteristics includes the characteristics of diameter, type, size, length, material, vendor, shape, and identity.

It is therefore another aspect, advantage, objective and embodiment of the invention, in addition to those discussed previously, to provide an industrial facility for mass production of cans wherein the first set of characteristics includes the characteristics of diameters, type, size, length, material, vendor, shape/geometry, step location, step width, step height, step blend radius body taper, rework taper, concentricity, roundness, performance history, location history, use history, rework history, and identity.

It is therefore another aspect, advantage, objective and embodiment of the invention, in addition to those discussed previously, to provide an industrial facility for mass production of cans wherein the first set of characteristics includes the characteristics of diameters, type, size, thickness, forming land location, forming land width, forming land taper, forming land entry angle, forming land exit angle, performance history, location history, use history, rework history, and identity.

It is therefore another aspect, advantage, objective and embodiment of the invention, in addition to those discussed previously, to provide an industrial facility for mass production of cans wherein the industrial facility further comprises:

a database including the characteristics.

It is therefore another aspect, advantage, objective and embodiment of the invention, in addition to those discussed previously, to provide an industrial facility for mass production of cans wherein the database is available to a second facility.

It is therefore another aspect, advantage, objective and embodiment of the invention, in addition to those discussed previously, to provide an industrial facility for mass production of cans wherein the second facility is a vendor.

It is therefore another aspect, advantage, objective and embodiment of the invention, in addition to those discussed previously, to provide an industrial facility for mass production of cans wherein the can production tool comprises a die having an RFID tag.

It is therefore another aspect, advantage, objective and embodiment of the invention, in addition to those discussed previously, to provide an industrial facility for mass production of cans wherein the can production tool comprises a punch having an RFID tag.

It is therefore another aspect, advantage, objective and embodiment of the invention, in addition to those discussed previously, to provide an industrial facility for mass production of cans wherein the can production tool comprises a knockout having an RFID tag.

INDEX TO REFERENCE NUMERALS

Figure 1:
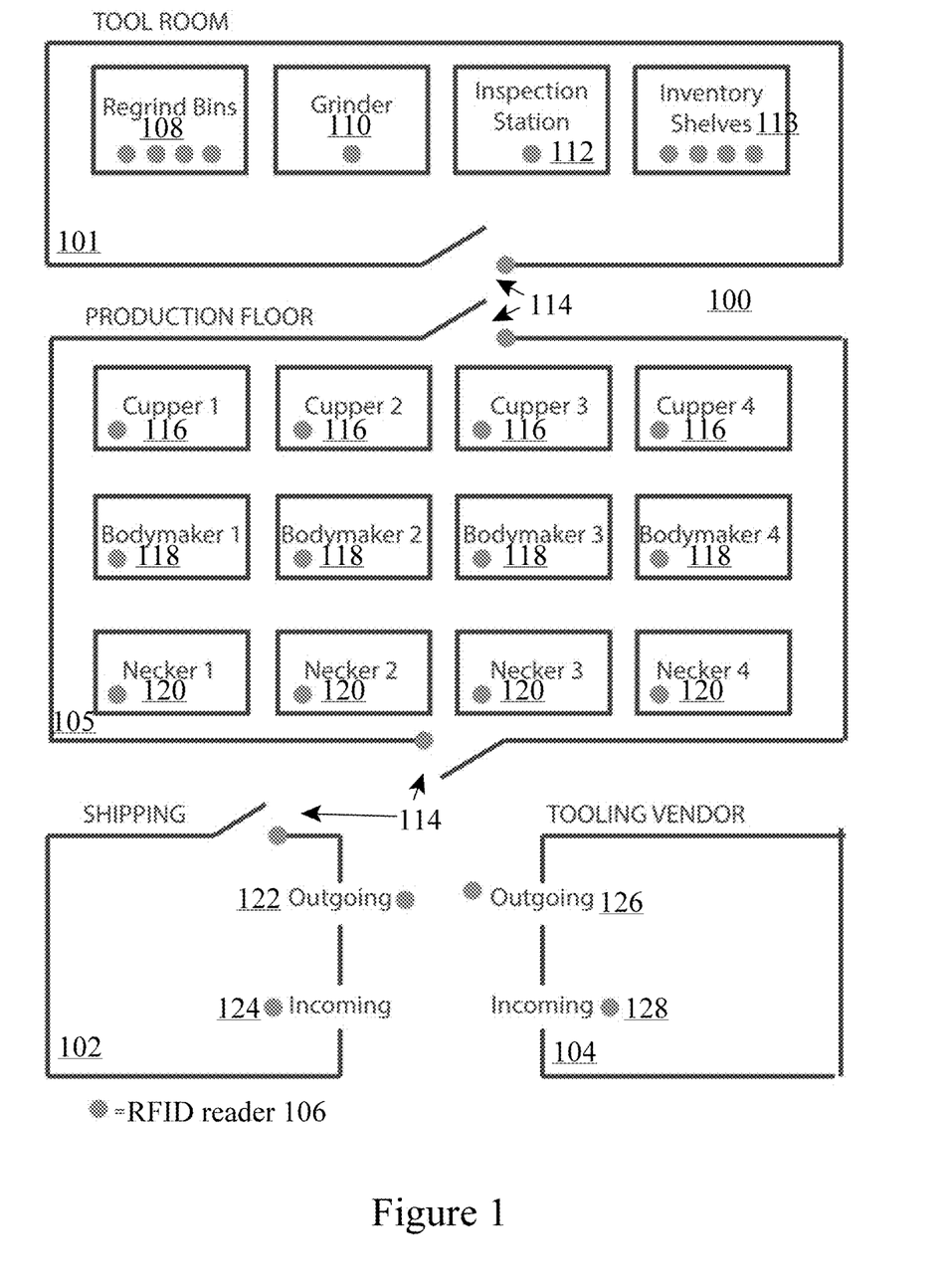
FIG. 1 is an overview block diagram of a first embodiment of the invention showing an extremely simplified production facility which requires repetitive use, regrinding, and reuse of production tooling.
Figure 2:
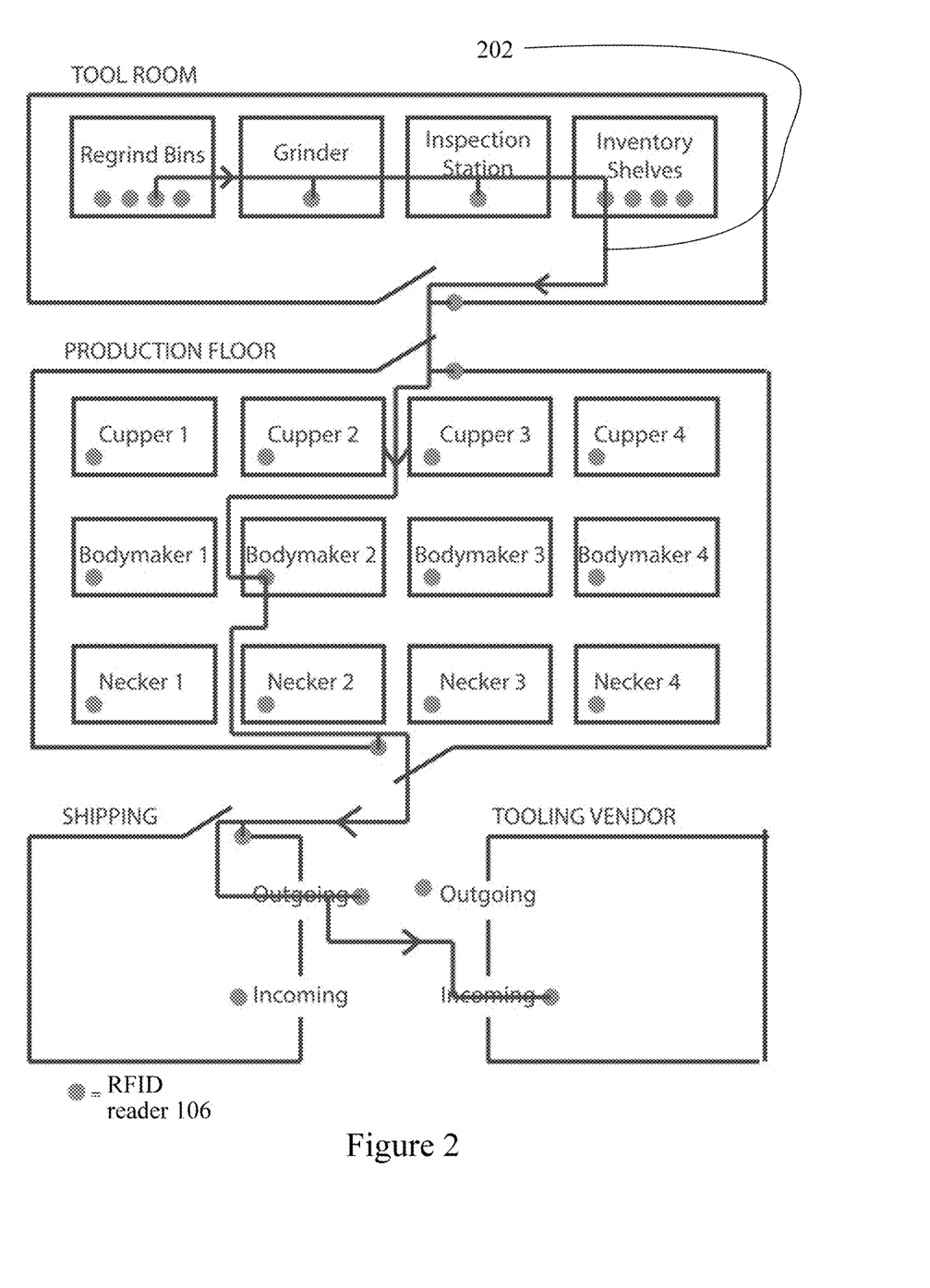
FIG. 2 is an overview block diagram of a first embodiment of the invention showing an extremely simplified production facility with a production tool following a path through the facility as it is reground, inspected, inventoried, used, and shipped back to a production tool vendor if necessary.
Figure 3:
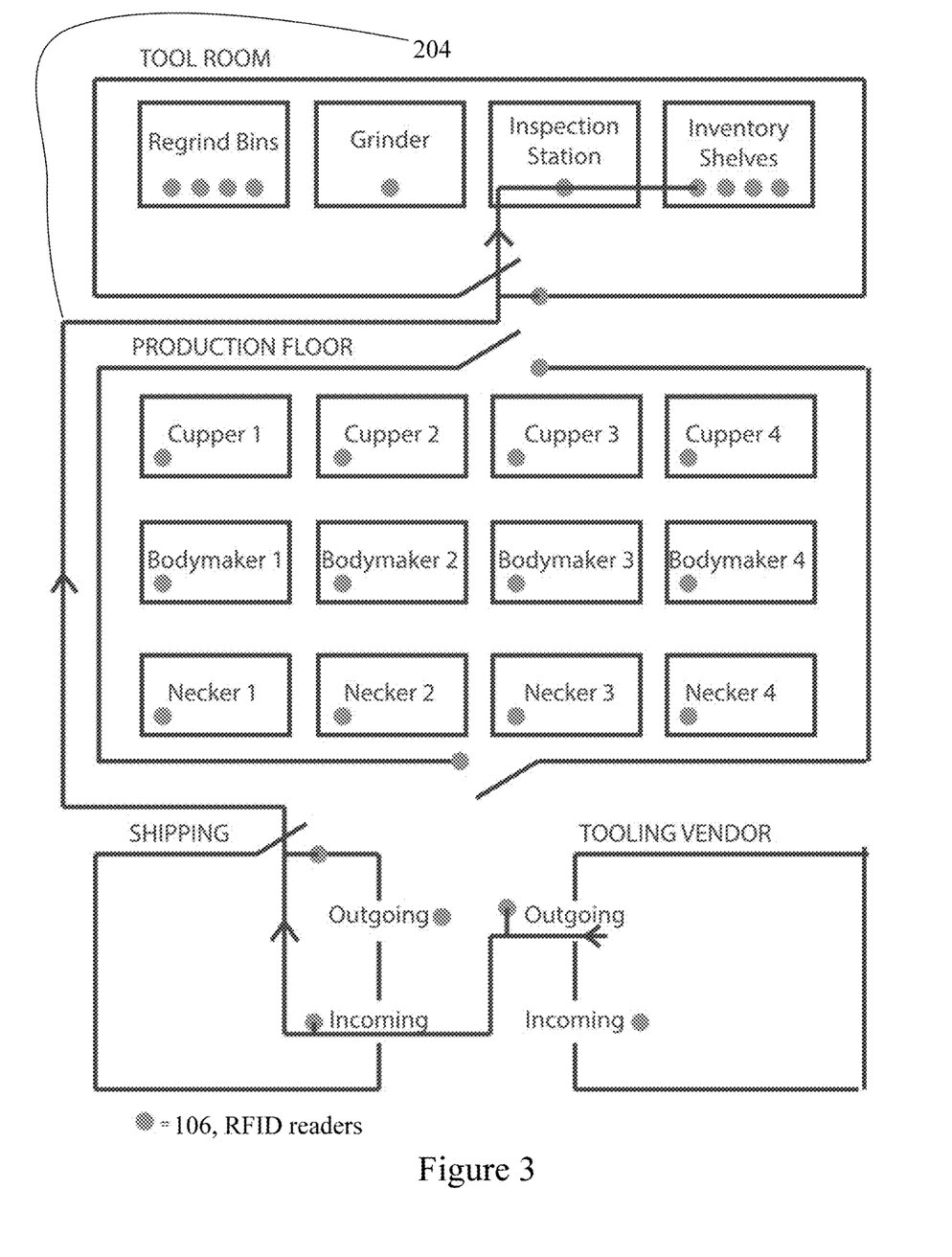
FIG. 3 is an overview block diagram of a first embodiment of the invention showing an extremely simplified production facility showing a production tool coming in from a production tool vender prior to an initial use.

FIGS. 1-3:
 Production facility 100
 Tool room 101
 Shipping 102
 Tooling vendor 104
 Production area 105
 RFID sensors 106 (multiple)
 Regrind bins 108
 Grinder 110
 Inspection station 112
 Inventory 113
 Doorway 114 (multiple)
 Cupper 116 (multiple)
 Bodymaker 118 (multiple)
 Necker 120 (multiple)
 Shipping outgoing 122
 Shipping incoming 124
 Production tooling outgoing 126
 Production tooling incoming 128
 Exemplary tool flow 1 202
 Exemplary tool flow 2 204
FIG. 4:
 Die with bar code 302
 Bar code 304
FIG. 5:
 Punch with RFID tag 406
FIG. 6:
 Die with RFID tag 408
FIG. 7:
 Die 500
 Forming land 502
 Inner Diameter ID 504
 Outer Diameter OD 506
FIG. 8:
 Punch 600
 Step 602
 Diameter 604

DETAILED DESCRIPTION

Glossary

Characteristics as used herein specifically refers to at least the diameters of dies (ID) and punches (OD), since even 0.0001" deviation in size is critical. Other characteristics include type, diameter, taper, size, length, material, vendor, shape, and also identity, shape/geometry, step location, step width, step height, step blend radius body taper, rework taper, concentricity, roundness, performance history, location history, use history, rework history, thickness, forming land location, forming land width, forming land taper, forming land entry angle, forming land exit angle, and so on and so forth. All or some of these, and any other characteristics, are meant when referring to the invention of non-contact near-proximity tracking of tool characteristics and identity.

As used herein, can making machines/production machines refers to at least cuppers, trimmers, body-makers, and neckers, as well as other can making machinery using tools therein: shapers, and so forth.

As used herein, a tool room need not be a room, but rather is a term used to indicate a part or area of a production facility used for machining of tooling As used herein an industrial production tool/tooling does not refer to a hand tool, a power tool, a consumer good or anything of the type. Instead, a tool refers to a specific industrial device used as part of a production machine. In use, the tool becomes a temporary part of the can making machinery, and is thus part of a factory. To reiterate: this patent does not concern hand tools, consumer goods, power tools, etc: it concerns industrial can making machinery and the tooling associated to manufacturing of cans such as knockouts, dies and punches which are used as parts of such can making machinery.

This invention does not cover the use inventorying of consumer goods, for example, this invention is not concerned with inventorying power tools in a hardware store prior to consumer purchase, nor with inventorying tools in a shop with a large number of hand workers nor anything similar either.

The invention also does not cover blanks or work pieces or other items which will during the course of production become finished consumer goods.

A production facility may be a factory, for example, one which produces cans and other cylindrical bodies.

One group is defined in the claims attached hereto. That group is not a Markush group and no legal claim to a Markush group is made, it is merely a cumulative list of locations within the industrial production facility of the invention: the locations at which an RFID reader may be disposed for tracking of the industrial tooling.

End Glossary

FIG. 4 is a PRIOR ART drawing of a production tool having a bar code incised thereon. Die 302 has bar code 304 incised thereon, normally be the tooling vendor. In practice, an industrial production facility will scan the bar code with an optical bar code scanner at one or two locations: the receiving department, the tool room and so on. The tool room will use the scanned bar code to manually track the location of the piece of tooling, for example, by scanning the bar code 304 and then on a computer database manually inputting a location at which that die 302 will be found until further manual updates.

Obviously the prior art system is subject to normal human error, for example, the person entering believes the die 302 is going to the production floor, but then learns that the die 302 diameter is slightly to large/small, and so the person switches the die 302 for some other die, and without remembering that they have updated the database to show die 302 on the production floor, leaves the database with the false indication that die 302 is in production.

The present invention does the entire tracking cycle automatically, without any human scanning and without any human data entry (note that optionally, especially in early embodiments of the invention, human entry may be added for greater control and flexibility: but this is optional). The present invention also continues to track the tooling constantly, not just at a few manually initiated times or places, and tracks type, diameter, taper, size, length, material, vendor, shape, and also identity and other characteristics as required or later developed.

FIG. 1 is an overview block diagram of a first embodiment of the invention showing an extremely simplified production facility which requires repetitive use, regrinding, and reuse of production tooling in a tool room 101. Production facility 100 has a shipping area/department 102 (this may also represent the entire shipping process, for example with a shipping company). Factory 100 also has a tooling vendor 104, which may be remotely located but is shown for convenience on the same diagram.

RFID sensors 106 are indicated by dots. It will be seen that there are a large number of these. (In contrast, prior art optical scanners are fairly few in the production facility 100.) RFID readers 106 may automatically and continuously track the locations of the various tooling.

For example, the regrind bins 108 may not just have a single RFID reader but instead may have a number, perhaps one per bin, one per shelf, one per rack and/or whatever arrangement is best suited for tracking specific items (per manufacturing facility) and allowing very quick locating of a desired piece of tooling. Another RFID reader or readers may be located at Grinder 110. Grinder 110 is the production facilities in-house machinery for making a piece of tooling such as a die or punch suitable for re-use in production. As noted previously, after a fairly short time (one million cans or more or less) a piece of tooling requires such regrinding.

It will be understood that size of the tooling is the characteristic which is probably of the greatest single importance.

Inspection station 112 verifies that a reground tool is actually acceptable for production. Thus it too may have an RFID reader/sensor/scanner, which allows facility personnel to check their database and see if an item which is needed very quickly has reached inspection stages of regrinding and reuse. Obviously their database will track identity of the tooling but also type, diameter, taper, size, length, material, vendor, shape, and so forth in addition to identity. Note that identity may be a simple number such as found on a prior art bar-code (see FIG. 4). By this means the invention may be backward compatible with older tooling, even though the tooling itself, lacking RFID tags, may not be forward compatible with the invention.

An item of industrial tooling not immediately needed will go to the inventory shelves 113 to await its return to the production floor 105.

Whenever an item of tooling is taken from tool room 101 to the production floor 105, it will pass through a doorway such as doorway 114 (there are multiple doorways throughout the factory 100). Doorway 114 and every industrially used doorway like 114 may be equipped with another RFID reader 106.

At this point it will become obvious that with a production facility 100 which is thoroughly covered with multiple strategically placed readers 106, the tooling will actually be trackable from room to room, in and out of doorways, and even to the specific machines onto which it is mounted for use in production, or the specific bin or shelf on which it sits awaiting some form of processing.

Since the facilities will customarily have a database of their tooling (either a manual ledger or an automated database) the present system may integrate with the individual business' database and if necessary with databases of other businesses as well. The present invention is not limited to and does not claim any particular type of database or accounting system.

In addition to that, turning attention to the production floor 105, it may be seen that each industrial production machine into which tooling may be incorporated (the word "incorporated" is used since in effect the tooling becomes a temporary part of the production machinery) also has an RFID reader therein/thereon/disposed therewith.

Obviously the RFID reader 106 method of fixture/mounting at a machine will vary depending upon the type of industrial production machine to which it is mounted/located/disposed: it may become a standard part of all industrial machinery, an optional accessory mounted into or onto the production machine, it may be a stand alone unit placed quite close to the machine and so forth.

It may be seen in FIG. 1 that there is a certain degree of separation of the readers on the machines. Each RFID reader 106 will have a range R measured for example in meters, centimeters, inches or feet. Overlapping of the range R of multiple readers 106 may be undesirable. However, the range R will in practice depend upon the exact mounting arrangement, the radiative environment of any particular room or factory and so forth. Thus the range R should be measured after mounting, to verify that an appropriate range R exists for each reader 106.

As an example, a production machine might have the reader 106 in a relatively open environment with excellent radiowave propagation, and thus the readers 106 will be separated by ten meters or more. On the other hand, the regrind bins might severely impact propagation of radio frequencies and thus might require/allow RFID readers 106 to be located one per shelf in close proximity. Close proximity and shorter range R may actually be desirable as it allows a more granular coverage of the facility and thus tighter and tighter location of the tooling.

Production floor 105 for a typical can making facility demonstrates that many types of production machinery and tooling are usable with the present invention.

Cupper 116 (again, multiple machines are provided with RFID readers 106) is one type of machine, and in the same facility 100 multiple bodymakers 118 provide the next stage of production, using different tooling.

Necker 120 would then use another die and knockout. (In practice, a complete single set of tools is likely to be a different number of knockouts and dies, but the number of tools in a set is not important, the ability to use RFID to track the tools, and thus track their characteristics, is important and novel.)

Shipping outgoing 122 may be a loading dock or the like, a doorway to a yard, and so forth. The same may be true for shipping incoming 124. Note yet again that this does NOT refer to tracking inventory of produced goods (that is, the invention does not track cans, instead it tracks can-making tooling and CHARACTERISTICS of tooling, for example: punches having an OD of 2.0058 inches or for example knockouts from vendor X).

Production tooling vendor 104 is shown quite close to the production facility, but in fact it may be (and usually is) far away and is often an entirely separate business.

Production tooling vendor 104 may also have RFID readers, perhaps both at the production tooling outgoing 126 and production tooling incoming 128 loading docks/doorways/departments. This allows a tracking system which is not limited to a single production facility, nor even a single business organization: a can maker, a tooling maker, a shipper and others may all be informationally integrated to allow tracking of the tooling BY CHARACTERISTICS, in particular, the very important diameters of punches and dies. (It is worth remembering that the tooling is expensive and thus tracking it for security reasons is also desirable.) FIG. 2 is an overview block diagram of a first embodiment of the invention showing an extremely simplified production facility with a production tool following a path through the facility as it is reground, inspected, inventoried, used, and shipped back to a production tool vendor if necessary.

Exemplary tool flow #1 (202) shows with an arrow a tool passing from a particular one of the regrind bin (indicated by the third RFID scanner 116 of regrind bin 108 to the grinder 110 where it is properly resized. Inspection state 112 verifies that the item of tooling is correctly sized and it then goes to the first RFID scanner of the inventory shelves 113.

At each step, the closest RFID scanner is indicating the present, real time location of the tool.

At some point the tool then is taken out of the tool room 101 via doorway 114, and again the RFID scanner (on doorway 114) marks this fact in the database. In addition, the tool passing through the next doorway into the production floor 105 is also marked. Note that due to time stamping at each RFID scan, even the time taken to move through the hallway is known, possibly leading to even further methods of increasing productivity.

In the instant example, the tooling is incorporated into bodymaker 2 (118) and used for some period of time. At that point the tool is removed and replaced.

In this particular example, the tool is not returned to the tool room 101, perhaps it is no longer regrindable to tolerances and thus it must go back to the tooling vendor. Once again it passes through a doorway, a hall and another doorway, with the appropriate RFID readers tracking it whenever it passes within range R of a reader. If any plant personnel become interested in the location of that tool they can simply check the records and determine that it is presently in shipping 102. After an outgoing RFID scan 122, it arrives at the tooling vendor 104 for an initial scan 128. At that point, production facility personnel can be assured that the tool has been successfully returned.

FIG. 3 is an overview block diagram of a first embodiment of the invention showing an extremely simplified production facility showing a production tool coming in from a production tool vender prior to an initial use.

In this flow case 204 a fresh tool is sent from vendor 104 with an outgoing scan 126 as it begins shipment. At the shipping department 102 an incoming scan 124, perhaps even dockside, places the tool in the facility 100 for anyone inquiring. It passes through the door 114 of shipping and the doorway 114 of the tool room 101 and is immediately inspected (112 RFID) and placed into inventory 113, ready for use in production.

Importantly, since the size of the tool is associated with the tool identity, by means of RFID the characteristic has been tracked.

Example One

In one example of use, a production facility finds that a punch which must be of outer diameter 2.1234" has worn down to 2.1232" inches. This size does not allow the punch to function properly in a tool set in which each punch and die must be slightly smaller than the previous one in the set and slightly larger than the next one in the same set. A punch cannot be ground upward in size, so the punch must be replaced.

The production facility manager then checks her records and finds that their only other punch of appropriate size is already in use in another set. Checking the tool room they discover that this needed size is not even available there. However due to use of the invention, RFID shows that a vendor does have the required size.

In practice, this example is fairly unlikely both because the vendor is surprisingly close and because the tool room staff were surprisingly negligent: it is worth remembering that the tool room staff should be using the system to anticipate the sizes which will soon be required. However, this example helps to show the power of the invention.

End Example One

Figure 5:
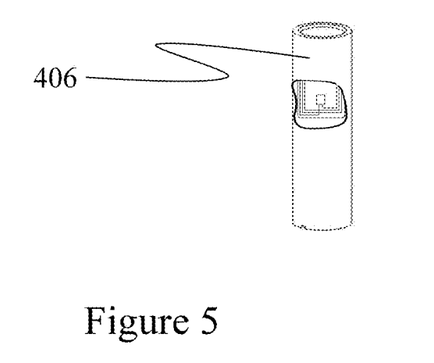
FIG. 5 is a tool according to the present invention with a production tool having an RFID therein.

FIG. 5 is a tool according to the present invention with a production tool having an RFID therein. Punch 406 with RFID tag has the tag internally and is thus externally completely identical to any other punch. Note that the bar code might be used or omitted depending upon commercial/industrial circumstances.

In this case, the tool has the RFID tag embedded within its body. This location may protect the RFID tag from the rigors of production, regrinding and so forth, but possibly at the cost of reduced range, increased cost and so forth.

The RFID tag may advantageously be embedded within the tool at the time of production, for example, with a hard covering over it which is transparent in radio frequencies. The radio transparent material may be only a part of the tool body, for example a part which does not endure direct contact with work pieces, mounts and so forth.

On the other hand, it may be possible to embed the RFID tag after the time of manufacture as a retrofit. For example, if the material of the punch body allows, a small space may be created, the RFID tag secured within the space, and the space refilled or sealed. This method would solve a problem mentioned earlier: older tooling would not initially be forward compatible with the new invention, but if retrofitted as described then the older tooling would be compatible with the invention.

Figure 6:
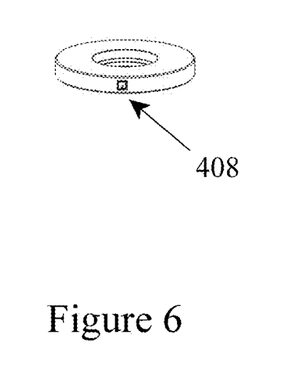
FIG. 6 is a tool according to the present invention with a production tool having an RFID thereon.

FIG. 6 is a tool according to the present invention with a production tool having an RFID thereon. The die has visible RFID tag 408 thereon.

This method of locating the RFID tag would be much easier to accomplish, and would allow very simple retrofits (adhering or securing the tag to the tool exterior). The disadvantage to this method would be that the RFID tag would be less protected from the potentially harsh conditions of production: one million cans punched between regrinds and so forth.

It may be seen that the invention may also work in an automated system, with alarms set for how tools are used, audit trails created by RFID, tool location tracking double checking that tools are in the correct locations and more. Such an automated alarm system and automated auditing would be impossible for a generic computer to carry out without the hardware of the present invention: tools with RFID equipment and fine grained RFID scanner networks to locate the tools.

Example Two

The tool of example one is in use. The facility in question has an automated database system which is hooked to the RFID network of tracking scanners. Because of the automated system the location and identity of the tool is known, and furthermore, alarms have been set to indicate whenever the tool has a mis-use problem.

But in addition to that, auditing may be enabled by RFID: when an entire box of tools is received from the vendor, the RFID tracking system will be able to audit the tools received versus invoiced.

The tool is thus audited and then placed on a shelf in the tool room, but due to human error it is the wrong shelf. An alarm is triggered to notify the shop supervisor of the incorrect placement.

Later, a bodymaker operator removes the tool from the shelf and the invention tracks the tool at the toolroom doorway, the shop floor doorway, and then after a first present time interval notes that the tool is never put into a machine, or that it registers as being located at a machine which also has another identical tool as well. Another alarm is triggered indicating that one tool or the other is "floating around" not being used nor returned to the tool room.

Later yet, the tool is inserted into a bodymaker machine but the machine is running in a sequence of tools which are of a sequence of diameters such that this tool will not provide accurate can manufacture: the diameter is too small or too large for this sequence of bodymaking. Another alarm is sounded before the bodymaker can crash.

Eventually the tool is used properly and returned to the tool room to be reworked, but its adventurous life continues after rework when it is not measured. Instead someone picks it up and tries to put it in a bodymaker without measurement. Yet another alarm is sounded.

End Example Two

Figure 7:
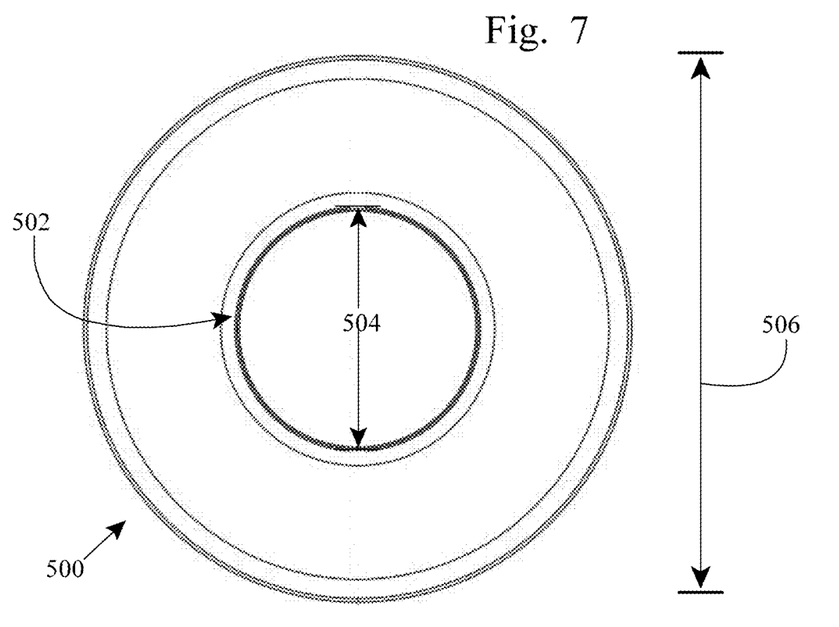
FIG. 7 is a planform view of a die as used in can manufacturing.

FIG. 7 is a planform view of a die as used in can manufacturing. Die 500 is a toroidal body of hard metal: the punch (FIG. 8) will pass through the center aperture and the work piece (can being formed) will be pushed from forming land 502 and thus narrowed, thinned and elongated. (Note that the process actually goes through several tools: one die and one punch do not usually form the can. Other steps in can production and other can making machines are being passed over for clarity in FIGS. 7 and 8.) The die inner diameter (ID) 504 must thus closely match the outer diameter of the punch, but must be slightly different. As noted previously, even 0.0001 inch is significant in can manufacture.

Outer diameter (OD) 506 may not seem relevant but in fact, the outer diameter and the other characteristics previously discussed such as vendor and so forth may determine how the die can be used, or if it can even be used at all.

It may be seen that the die has numerous additional characteristics which are invisible to the naked eye: type, material, vendor, shape, and also identity, performance history, location history, use history, rework history, thickness, forming land location, forming land width, forming land taper, forming land entry angle, forming land exit angle, and so forth: the forming land and diameters may be seen but a rework history for example would be part of the audit/tracking ledger or database: while important aspects of the die they are not physical structures like the forming land shown.

Figure 8:
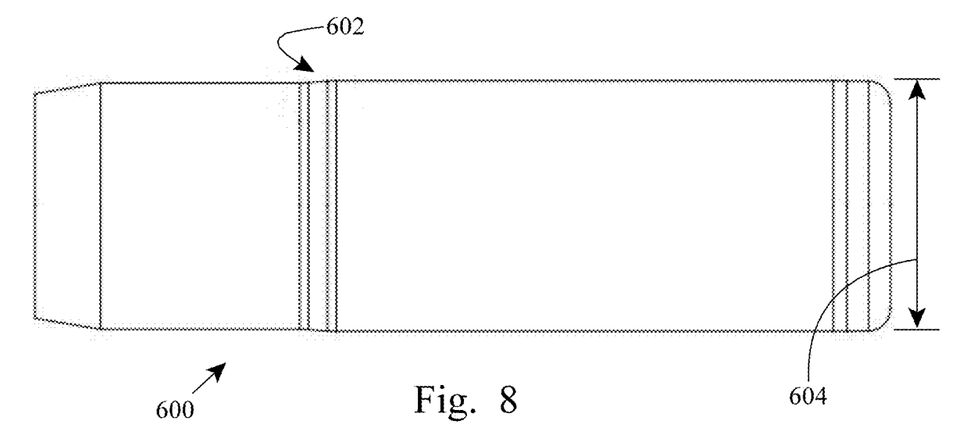
FIG. 8 is a side view of a punch as used in can manufacturing.

FIG. 8 is a side view of a punch as used in can manufacturing. Punch 600 has a geometry/shape which is extremely important to the manufacturer, not to mention features such as the step 602, body taper (not shown here), roundness (not visible here), and, like the die 500, issues such as length and vendor may impact usability, as well as similar characteristics like shape/geometry, step location, step width, step height, step blend radius body taper, rework taper, concentricity, roundness, and invisible characteristics to also be tracked, indexed, searched etc just like physical characteristics. The list above (histories, etc) applies to the punch as well as to the die.

Diameter 604 (an outer diameter) is of course a crucial characteristic to track in the invention. Other characteristics to track include the full list included in this application.

As stated previously, a group is defined in the claims attached hereto. The group is not a Markush group and no legal claim to a Markush group is made, it is a cumulative list of locations within the industrial production facility of the invention.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

What is claimed is:

1. An industrial facility for mass production of cans using industrial production tools including knockouts, punches, dies, and shapers, the industrial facility comprising:
    a plurality of N can making machines, and a plurality of industrial production tools, each can making machine having at least one industrial production tool mounted to it, each industrial production tool having an RFID (radio frequency identification) tag;
    a production area, the plurality of N can making machines disposed in the production area, the production area having a first door;
    a tool area, the tool area having a re-tool storage space, a re-tooling machine, an inspection station, and an inventory storage space, the tool area having a second door;
    a first RFID reader disposed at the first door;
    a second RFID reader disposed at the second door;
    a third RFID reader disposed at the re-tool storage space;
    a fourth RFID reader disposed at the re-tooling machine;
    a fifth RFID reader disposed at the inspection station;
    a sixth RFID reader disposed at the inventory storage space;
    a plurality of N additional RFID readers disposed at the plurality of N can making machines, one each of the N additional RFID readers disposed at each one of the plurality of N can making machines, whereby each can making machine has a single RFID reader;
    each RFID reader having a range R;
    a group of assigned places, the group consisting of the plurality of N can making machines, the first and second doors, the re-tool storage space, the re-tooling machine, the inspection station, and the inventory storage space;
    each member of the group being located apart from any other member of the group at a distance equal to or greater than the range R whereby any single RFID tag of the RFID tags is only readable by one RFID reader, whereby the location of each one of the plurality of industrial production tools is known.

2. The industrial facility for mass production of cans of claim 1, wherein the range R of each single RFID reader of the RFID readers is determined individually after being disposed at one member of the group.

3. The industrial facility for mass production of cans of claim 2, wherein the RFID tags are passive RFID tags.

4. The industrial facility for mass production of cans of claim 2, wherein the RFID tags are active RFID tags.

5. The industrial facility for mass production of cans of claim 3, wherein the RFID readers are active readers.

6. The industrial facility for mass production of cans of claim 4, wherein the RFID readers are passive RFID readers.

7. The industrial facility for mass production of cans of claim 4, wherein the RFID readers are active RFID readers.

8. The industrial facility for mass production of cans of claim 2, wherein each one of the plurality of industrial production tools has a first characteristic associated with it.

9. The industrial facility for mass production of cans of claim 8, wherein the first characteristic is a diameter.

10. The industrial facility for mass production of cans of claim 2, wherein each one of the plurality of industrial production tools has a first set of characteristics associated with it.

11. The industrial facility for mass production of cans of claim 10, wherein the first set of characteristics includes characteristics of diameters, type, size, length, material, vendor, shape/geometry, step location, step width, step height, step blend radius body taper, rework taper, concentricity, roundness, performance history, location history, use history, rework history, and identity.

12. The industrial facility for mass production of cans of claim 10, wherein the first set of characteristics includes characteristics of diameters, type, size, thickness, forming land location, forming land width, forming land taper, forming land entry angle, forming land exit angle, performance history, location history, use history, rework history, and identity.

13. The industrial facility for mass production of cans of claim 10, wherein the industrial facility further comprises:
    a database including the characteristics.

14. The industrial facility of claim 13, wherein the database is available to a second facility.

15. The industrial facility of claim 14, wherein the second facility is a vendor.

* * * * *